(12) United States Patent
Kajtár et al.

(10) Patent No.: US 7,537,666 B2
(45) Date of Patent: May 26, 2009

(54) METHOD FOR ARMING COMPOSIT-FABRICATION OF OPEN-AIR LOCATED OBJECTS

(75) Inventors: Vilmos Kajtár, Budapest (HU); József Maros, Budakeszi (HU); Árpád Szilágyi, Budapest (HU); Árpád Szilágyi, legal representative, Budapest (HU); Csaba Kétszeri, Siófok (HU); Imre Vehofsits, Siófok (HU); Pëter Gara, Törökbálint (HU); György Kollár, Budapest (HU)

(73) Assignees: GRP Plasticorr, Budapest (HU); MOL Foldgazszallito, Siofok (HU); Gksoft BT., Budapest (HU)

( * ) Notice: Subject to any disclaimer, the term of this patent is extended or adjusted under 35 U.S.C. 154(b) by 0 days.

(21) Appl. No.: 11/570,271

(22) PCT Filed: Jun. 10, 2005

(86) PCT No.: PCT/HU2005/000065

§ 371 (c)(1),
(2), (4) Date: Apr. 5, 2007

(87) PCT Pub. No.: WO2005/121224

PCT Pub. Date: Dec. 22, 2005

(65) Prior Publication Data

US 2007/0292621 A1    Dec. 20, 2007

(30) Foreign Application Priority Data

Jun. 11, 2000    (HU) ................... 0401172

(51) Int. Cl.
*B29C 73/00* (2006.01)
*B32B 43/00* (2006.01)
*B29C 70/86* (2006.01)
*B29C 53/58* (2006.01)
*B29C 53/80* (2006.01)
*B32B 25/02* (2006.01)
*B32B 25/10* (2006.01)

(52) U.S. Cl. .................. 156/94; 156/172; 156/173; 156/175; 428/295.1; 428/295.4

(58) Field of Classification Search ............... 156/94, 156/172, 173, 175; 428/295.1, 295.4
See application file for complete search history.

(56) References Cited

U.S. PATENT DOCUMENTS

| 4,446,259 A | * | 5/1984 | Vasta ..................... 523/408 |
| 5,268,223 A | * | 12/1993 | Qureshi et al. ............. 442/391 |
| 5,677,046 A | | 10/1997 | Fawley et al. |
| 6,103,779 A | * | 8/2000 | Guzauskas ................ 523/115 |
| 2003/0099828 A1 | * | 5/2003 | Bundo et al. .............. 428/352 |

FOREIGN PATENT DOCUMENTS

GB    2099753 A    12/1982

* cited by examiner

*Primary Examiner*—Philip C Tucker
*Assistant Examiner*—Michael N Orlando
(74) *Attorney, Agent, or Firm*—Lucas & Mercanti, LLP

(57) ABSTRACT

The invention describes the production and utilization of a multi-layer composite material, a polyester resin and/or vinyl-ester resin based adhesive with special composition, applied on the surface or between the layer of the enforced object, which is made of unsaturated polyester resin and/or vinyl-ester resin based, glass-fiber reinforced, pre-made band shaped prepreg material, which can be used on surface of cylindrically symmetric objects like piers, pipes, pillars, etc. to strengthen their stability, endurance and resistance. This material can also be used to repair certain small irregularities on the enforced objects surface. Initiators and substances are added to the prepreg's matrix material, such as poly-ϵ-caprolacton; acetyl-acetone and alkyl-(acrylate)-methacrylate type monomers to result in networking of the resins. Peroxides decompose due to activator compounds coming from diffusion on the surface of the adhesive substance. This process ensures the complete hardening of the composite band on the whole surface and homogeneity of the assumption of load.

14 Claims, No Drawings

METHOD FOR ARMING COMPOSIT-FABRICATION OF OPEN-AIR LOCATED OBJECTS

BACKGROUND OF THE INVENTION

1. Field of the Invention

The invention is used to improve/repair the durability of open-air located objects such as piers, pillars, pipes, or other cylindrically symmetrical shaped objects, or to rehabilitate their mechanical attributes after damaging events. The adhesive of the invention can also be used to repair certain small irregularities on the surfaces of enforced objects. The adhesive can be prepared, used and hardened at the location of the enforced objects and while the objects are fully operating, even if the temperature is relatively cold, for example, at about 0° C.

2. Description of Related Art

Equipment and buildings are the victim of erosion, and consequently require repair and restoration. Due to erosion and corrosive effects, objects (such as piers, pipes, pillars, etc.) can have weakened structures or mechanical attributes. To repair these weaknesses, we often use bands of various composition, which are applied on the whole surface of the damaged structure, or just on the location where repair is necessary.

Numerous patents are directed to materials containing glass fiber strengthening materials in resin matrixes for enforcing bands. According to Canadian Pat. No. 2,028,524 and U.S. Pat. No. 4,700,752 for example, bands are made of a resin polyurethane-epoxy- or an embedded unsaturated poly-ester resin matrix, which provide fiber-optic enforcing materials having improved tensile strength.

One procedure is rotating the target object to give the glass fiber band a "resin bath" and to reel the object with it, thereby creating an enforcing band. Warming is usually used to harden the resin in the band. This procedure can only be applied in ideal circumstances. It isn't useable for large open-air located objects (large piers, pipes, pillars are very difficult if not impossible to rotate).

Another method for enforcing objects separates the embedded glass fiber in resin and applies the band on the surface of the object. This sort of action requires three steps, the first being embedding the glass fiber in the composite matrix (the resin). The second step includes reeling this pre-made, impregnated composite (prepreg) on the object in need of strengthening. The third step is solidifying the band. This is usually resolved by the heat transfer.

These procedures have several practical issues. One of the issues is positioning parallel enforcing strings perpendicular to the direction of the body of the object. The geometry of the parallel strings is also a problem because the cross-section of the band is smaller between the strings then in the position of the greatest diameter of the string. As a result, the band is uneven, irregular, and ribbed in its lengthwise direction. It is recommended for multi-thread bands that the "top of the wave" sections are implemented in the "bottoms of the waves". This way the band is continuous and there won't be any open spaces in the band's structure. The correct positioning of the strings can improve the strengthening effect and the distribution of the matrix-material on the whole length of the band. This procedure requires extreme attention and the participation of the human workforce.

The formerly known procedures can't be used in some circumstances, because of bad weather and in other situations such as underground gas pipes in fast streams, or under high pressure. The rocks surrounding these pipes are constantly below 10° C. regardless of the season or the weather, although the initiators used to harden the composite coating are activated by the heat. For this effect to happen in the opportune time, heat is introduced through the outer layer of the prepreg material.

The composite band has a relatively reduced heat-transfer so it loses a huge amount of heat because of the cold surroundings and because of the transported medium's speed. The temperature in the immediate vicinity of the pipe is mostly induced by the pipes inner temperature. Because of the great parasite currents in the pipe, there is a big amount of heat transferred to the outer surroundings. Heating patrons are placed on the surface of the band (for helping the chemical hardening process) because of the reduced heat-transferring ability of the band's materials. The walls of the pipe receive very little heat through the composite material, because the inner medium transports most of it. A steady state develops with two extreme temperatures on the walls of the pipe (0-10° C.) and the exterior part of the band (130-135° C.). The initiator substance which helps harden the unsaturated poly-ester resin requires a minimum of 50-60° C., but as we saw the layer of the resin placed right in the vicinity of the walls of the pipes doesn't reach that temperature, so the initiator substance isn't efficient.

Those procedures which are based on heat-based polymerization of the band's structure don't work under the described circumstances, because the band's material (or part of the material) doesn't solidify properly or at all.

There have been attempts to dispose of these difficulties; like pre-making the composite band, already hardened, solidified and in the shape of a roll. (U.S. Pat. No. 5,518,568; U.S. Pat. No. 5,677,046; U.S. Pat. No. 5,683,530; U.S. Pat. No. 6,336,983). In this case, at least one side of the pre-made composite band is plain.

The clock spring shaped reeled composite band's radius of curvature is only half of the tile object's radius of curvature. When applying the pre-made band on the object, the flexible tension helps fix the band on the object.

The solid, rigid composite band's usage is problematic if the surface of the enforced object isn't regularly even. This can cause a problem between the composite band and the surface of the object, they won't stick together. The space between the two surfaces has to be filled with an adhesive. The bond made in this way is not as solid as it would be in the case of an object with even surface. Because of this, the surface of the object has to be previously formed, smoothened; or the band has to be made of the composite prepreg which hardens at the place of the operations.

The welded seam problem could be resolved by the circular seam (U.S. Pat. No. 5,518,568). According to the U.S. Pat. No. 5,518,568, two separate bands are placed on the two sides of a welded seam, and a third band is placed on top and bridges the gap between the other two. Three full bands are built in the strengthening structure with this method.

The described patents have a rigid composite material. The pre-made prepreg is not plastic, so it's not suitable for covering the whole surface of the object's irregularities and curves.

The formerly known procedures have the following disadvantages:

the strengthening material's strings need to be positioned in a specific order, which is difficult and requires human assistance. This can't be done in outdoor surroundings.

they aren't suitable for large, open-air located objects.

the composite prepreg can not reticulate in cold (below 15° C.) or if the band connects to cold surfaces.

the solid rigid prepreg (clock spring) isn't suitable, (or only after numerous procedures which use material and energy) for covering any surface, with the irregularities, or the curves they might have.

SUMMARY OF THE INVENTION

This invention describes a material structure and its utilization with which the enlisted technological problems can be resolved.

Different types of objects, especially pipes, can be improved with the glass-fiber strengthened, unsaturated polyester/vinyl-ester resin bonded composite band of the invention. According to the present invention, the making of the band requires a pre-made prepreg, made of a resin-matrix material and a glass-fiber strengthening material; and a very flexible adhesive which is used to fix the band to the metallic surface of the object thereby creating a very stable fixing between the layer's of the band.

DETAILED DESCRIPTION OF THE INVENTION

The composition of the adhesive: 30-50 m/m % of an unsaturated polyester resin and/or vinyl-ester resin; 1-10 m/m % of a (meth)acryl-acid-ester monomer; 1-5 m/m % of a thixatropic additive; 30-50 m/m % of aluminum-hydroxide and/or a $CaCO_3$ powder and/or talcum or any kind of mixture of these elements; 1-5 m/m % of diacil-peroxide, keton-peroxide, kumol-hydro-peroxide or any kind of mixture of these elements; 0.1-1 m/m % of N,N-di-methyl-aniline and/or 0.1-1 m/m % of N,N-diethyl-aniline; 1-5 m/m % of a 1% solution of cobalt-naftenate; 1-5 m/m % of a solution of 1-5 m/m % vanadium-naphthenate; 0.5-1 m/m % of acetyl-acetone.

The matrix-material used to produce the prepreg includes: 25-40 m/m % of unsaturated orto- and/or isophthalic polyester resin in styrol; 35 m/m % and/or novolac-epoxy vinyl-ester resin or any mixture of these materials; 5-10 m/m % of MgO, and/or ZnO, and/or BaO and/or CaO; 1-5 m/m % of a thermoplastic polymer; cellulose-aceto-butyrate and/or cellulose-acetate; 3-10 m/m % of poly-ϵ-caprolacton; 30-50 m/m % of a filling material: any kind of mixture of aluminum-hydroxide, $CaCO_3$ powder, talcum, quartz powder; 0.5-3 m/m % of an initiator: percarbonate, dibenzoil-peroxide, t-butyl-perbenzoate, acetyl-acetone-peroxide, diketal, organic hydroperoxide or any kind of mixture of these substances.

The enlisted materials are mixed together and homogenized to gain the resin matrix-structure. One part of the gained substance is introduced on a polyethylene (PET) foil. The selected one way orientated enforcing material is placed in the foil as well, embedding it in the matrix-material on both sides. The embedded enforcing material is then once again placed in another foil. Then, the material passes through a specially projected machine formed by rolls with a variable distance between them. The distance between the rolls is set previously according to the desired thickness. The prepreg material obtained in this way is packed in aluminum foil and kept at a constant 5-15° C. temperature till usage.

Bands of optional width and length can be attained using this procedure. The width of the bands is given by the geometry of the glass-fiber used as the strengthening material.

The prepared prepreg strengthening material's composure can be 50-60 m/m % of a glass-fiber based 0.2-1.3 m wide material. It looks like a textile, it is sold in rolls. Parallel bands of glass-fiber wires run along its longitudinal axis (10-50 m), which are loosely bonded together with a so called glass-duvet.

When preparing the enforcing band, the pipe has to be perfectly clean to the metal, leaving no grease on it. Then, the pre-made and already described adhesive substance is applied in a thin layer on the perfectly clean surface of the pipe covering the irregularities. The pre-made prepreg is carefully cleaned of the aluminum foils and placed leveling it evenly on the layer of adhesive.

A roller is used with low pressure to secure the connection between the adhesive and the prepreg material. The upper layer of the prepreg is once again adhered and covered with another layer of prepreg. This procedure is repeated until there are as many layers as planned. The upper layer of the band is covered with a PET foil. The minimum number of layers used for optimal enforcement is 5, but usually 8 layers are used.

Heat patrons (resistance-heating or inductive-heating) are used on the upper layer of the band to enhance the hardening process. These heat patrons are inductive or resistive. If these patrons are used, a 1 mm thick steel plate is placed circularly over the surface of the band. The heat patrons having a total of 5 kW of heat output are put on this steel plate to ensure even distribution of the heat. In case of external warming, the objects connected to the band (heat patrons) can't reach a temperature higher then 130° C. A thermometer (thermo pair) is placed in the lowest layer and one in the top layer to control the inner heat-relations. A thermo battery is placed into the top and lowest layer as well.

Advantages of the invention:
  the prepreg material can be formed as the user wants it, it can repair and cover the irregularities as well.
  the prepreg material can be solidified even if connected to a low temperature object (0° C.).
  the invention is able to be used in case of large, open-air located objects.

Some examples will be explained to demonstrate the competency of the invention in use (mostly in case of enhancement of pipe durability).

Table no. 1 represents the results of a series of experiments: the changing of the solidifying circumstances of the prepreg based composite band.

The columns of the table show the composure of the bands and the main parameters of the solidifying prepreg adhesive. The main parameters are: temperature of the pipe's wall (with the lowest temperature on which the band perfectly solidifies under the specified time), and the comparative data refers to the temperature of the heat patron (130° C. in every experiment).

The composition of the 100 kg prepreg matrix material base mixture (M): 25-40 m/m % of an unsaturated polyester resin and/or novolac-epoxy based vinyl-ester resin (DER 8084) (or any kind of mixture of these two substances) solution (35 m/m % in styrol) synthesized from o-phtale acid ethylene-glycol-propylene-glycol-mallein-acid-anhidrid or i-phtale acid neo-pentyle-glycol-propylene-glycot-mallein-acid-anhidrid 1:1 mixture; 5-10 m/m % of MgO and/or ZnO and/or BaO and/or CaO; 1-5 m/m % of a thermoplastic polymer: cellulose-aceto-butyrate and/or cellulose acetate; 30-50 m/m % of a filling material: any mixture of aluminum-hydroxide, $CaCO_3$ powder, talcum and quartz powder.

Different types of polymer initiators and different quantities of poly-ϵ-caprolacton were added to this unsaturated polyester resin based matrix material (base mixture of the matrix material: M).

The composition of the 100 kg adhesive base mixture (R): 30-50 m/m % of an unsaturated polyester resin and/or vinyl-ester resin (DER 8084); 1-5 m/m % of a thixatropic additive (active silica based ex. AEROSIL R202); 30-50 m/m % of aluminum-hydroxide, $CaCO_3$ powder and/or talcum.

Depending on the composition of the initiator-activator systems used to start the networking, there will be added in different quantities active (methacrylate) monomers and acetyl-acetone to the adhesive base mixture (R).

The first column of the table presents the experiment's circumstances of the first example.

Column 2 presents the circumstances in case of example 2.

Column 3 presents the circumstances in case of example 3, showing the effects of the added substances (MMA monomer, poly-ϵ-caprolacton, respectively acetyl-acetone) as the examples show.

Columns 4 to 5 present the diffusion efficiency of the cobalt activator substance and/or of an activator containing vanadium-naphtenate in the presence of MMA monomer poly-ϵ-caprolacton.

Aluminum-hydroxide (ATH), talcum, quartz powder, $CaCO_3$ powder and dolomite powder were evenly used during the assembling of the samples, in case of both the prepreg matrix material and the adhesive.

The added materials' effect on the networking of the material system isn't influenced by the choice of the unsaturated polyester resins, respectively vinyl-ester resin's type (o-phtal acid, i-phtal acid polyester resin, bis-phenol-A- or novolac-epoxy based vinyl-ester resin). This issue is dealt with in Example 4.

Example 1

To create the adhesive are mixed together 100 kg of a very flexible vinyl-ester resin (DER 8084), 10 kg of a methyl-methacrylate (MMA) monomer, 3 kg of a thixatropic substance (active silica based, for ex. AEROSIL R202), 100 kg of aluminum-hydroxide (ATH), 2 kg of diacyle-peroxide and 2 kg of an N,N-di-methyl-aniline activator (10 m/m % solution). Right before working with the band, 2 kg of a cobalt-naphtenate solution (1 m/m %) has to be added to the material of the adhesive, to ensure that the peroxide initiator added to the matrix-material will activate at low temperature as well. The adhesive mixed in this way will be viscously fluid for 30 minutes at normal temperature, and reaches the gelling point after a maximum of 60 minutes. This material is supposed to ensure the cohesion of the metal and the band in between the layer's of the composite material, filling the irregularities of the surface.

The substances needed to create the prepreg resin's matrix-material are added one by one and homogenized as they are added. In this case the substances are: 100 kg of an unsaturated polyester resin solution (35 m/m % in styrol) gained from synthesizing o-phtale acid ethylene-glycol-propylene-glycol-mallein-acid-anhydrid at a rate of 1:1; 3 kg of MgO (magnesium-oxide); 5 kg of a thermoplastic polymer (ACA—cellulose-acetate); 5 kg of poly-ϵ-caprolacton, 100 kg of talcum; 2 kg of an initiator (0.5 kg per-carbonate, 1.5 kg t-butyl-per-benzoate).

The enforcing material used in the prepreg is a textile-like material, sold in rolls, 0.2-1.3 m wide, having parallel bands of glass-fiber wires running along its longitudinal axis (10-50 m), which are loosely bonded together with a so called glass-duvet.

During the preparation of the prepreg, the next procedure is followed:

Part of the ready resin-matrix material is placed on a PET foil. A corresponding sized part (0.3×4 m in this case) of the unidirectional orientated, glass-fiber based enforcing material is then introduced in the foil and soaked well with the resin-matrix (both sides of the material). The soaked glass-fiber is then "ironed" between two vulcanite rolls. The distance between the two rolls is known and pre-set.

The prepreg made this way can be stored without losing properties for 30 days in normal temperature, or 90 days if the temperature doesn't reach 20° C. A day after its production, however, it is perfectly usable. The PET foil can be taken off its surface—which isn't sticky after a day.

Any sized composite prepreg bands can be produced this way. The width of the prepreg is induced by the geometry of the glass-fiber. The product is stored in aluminum foil at 5-15° C. till usage.

Preparing the enforcing band:

The pipe has to be perfectly clean, to the metal, leaving no grease on it. Then, the pre-made and already described adhesive substance is applied in a thin layer on the perfectly clean surface of the pipe covering the irregularities. The pre-made prepreg is carefully cleaned of the aluminum foils and placed leveling it evenly on the layer of adhesive.

A roller is used with low pressure to secure the connection between the adhesive and the prepreg material. The upper layer of the prepreg is once again adhered and covered with another layer of prepreg. This procedure is repeated until there are as many layers as planned. The upper layer of the band is covered with the already used PET foil. The minimum number of layers used for optimal enforcement is 5, but usually 8 layers are used.

In this example, a 4 m long prepreg is produced. The full weight of the band is 4.12 kg, the glass-fiber having 1.72 kg. The weight of the adhesive needed is 0.85 kg. The band was used to create an 8-layer band on a 150 mm steel pipe's surface.

Heat patrons are used on the upper layer of the band to enhance the hardening process. These heat patrons are inductive or resistive. If these patrons are used, a 1 mm thick steel plate is placed circularly on the surface of the band. The heat patrons having a total of 5 kW of heat output are put on this steel plate to ensure even distribution of the heat.

A thermometer (thermo par) is placed in the layer closest to the pipe and one in the top layer to control the inner heat-relations.

During the experiment, the pipe's wall was at 0° C. The upper layer of the prepreg reached 130° C. in 20 minutes. During this the inner layer remained at 0° C. Heating continued for 60 minutes more, controlling the upper layer's by stabilization. During this time the entire band solidified.

Thus, having a cobalt activator in the composition of the adhesive has a benefic effect in the chemical reactions taking place in the prepreg, if it contains an MMA monomer and/or poly-ϵ-caprolacton. These substances help the activator to get through by diffusion from the adhesive to the matrix-material of the prepreg, and start the discomposure of the initiator (per-carbonate, per-benzoate add mixture). In this way, the band and the adhesive reticulate simultaneously, the composite band solidifying completely (table column 1).

Example 2

The production of the prepreg matrix-material is similar to the production in the first example: 100 kg of an unsaturated polyester resin solution (35 m/m % in sterol) gained from synthesizing o-phtale acid ethylene-glycol-propylene-glycol-mallein-acid-anhydrid at a rate of 1:1; 3 kg of MgO (magnesium-oxide); 5 kg of a thermoplastic polymer (ACA—cellulose-acetate); 10 kg of poly-ϵ-caprolacton, 100 kg of talcum; 2 kg of an initiator (0.5 kg per-carbonate, 1.5 kg t-butyl-per-benzoate). The substances needed to create the prepreg resin's matrix-material are added one by one and homogenized as they are added.

Part of the ready resin-matrix material is placed on a PET foil. A corresponding sized part (0.3×4 m in this case) of the unidirectional orientated, glass-fiber based enforcing material is then introduced in the foil and soaked with the resin-matrix (both sides of the material). The soaked glass-fiber is then "ironed" between two vulcanite rolls. The distance between the two rolls is known and pre-set.

To create the adhesive, 100 kg of a very flexible vinyl-ester resin, 10 kg of a methyl-methacrylate (MMA) monomer, 3 kg of a thixatropic substance (active silica based, for ex. AEROSIL R202), 100 kg of aluminum-hydroxide (ATH) and 2 kg of diacyle-peroxide, 2 kg of an alkyl-aroma-amine (DMA) solution (10 m/m %) is also used as an activator.

Right before working with the band, 2 kg of a cobalt-naphtenate solution (1 m/m %) has to be added to the material of the adhesive, to ensure that the peroxide initiator added to the matrix-material will activate at low temperature as well. The adhesive mixed in this way will be viscously fluid for 30 minutes at normal temperature, and reaches the gelling point after a maximum of 60 minutes.

In this example, a 4 m long prepreg is produced. The fall weight of the band is 4.12 kg, the glass-fiber having 1.72 kg. The weight of the adhesive needed is 0.85 kg. The band was used to create an 8-layer band on a 150 mm steel pipe's surface. Water has been transported in the pipe; the water's temperature: 0° C.

The pipe's wall was also at 0° C. A thermometer (thermo par) is placed in the layer closest to the pipe and one in the top layer to follow the inner heat-relations.

The upper layer of the prepreg reached 130° C. in 20 minutes. During this the inner layer remained at 0° C. Heating continued for 90 minutes more, controlling the upper layer's temperature by stabilization. During this time the entire band solidified.

The experiments confirm that the cobalt activator has a pronounced effect on the chemical reactions in the prepreg. This surprising effect can only be explained with the transferring by diffusion of the cobalt mixture from the adhesive to the matrix-material. This transfer is aided by the poly-ϵ-caprolacton (table column 2).

Example 3

The production of the prepreg matrix-material is similar to the production in the first example: 100 kg of an unsaturated polyester resin solution (35 m/m % in sterol) gained from synthesizing o-phtale acid ethylene-glycol-propylene-glycol-mallein-acid-anhydrid at a rate of 1:1; 3 kg of MgO (magnesium-oxide); 5 kg of a thermoplastic polymer (CAB—cellulose-aceto-butyrate); 100 kg of talcum; 2 kg of an initiator (0.5 kg per-carbonate, 1.5 kg t-butyl-per-benzoate). The substances needed to create the prepreg resin's matrix-material are added one by one and homogenized as they are added.

Part of the ready resin-matrix material is placed on a PET foil. A corresponding sized part (0.3×4 m in this case) of the unidirectional orientated, glass-fiber based enforcing material is then introduced in the foil and soaked well with the resin-matrix (both sides of the material). The soaked glass-fiber is then "ironed" between two vulcanite rolls. The distance between the two rolls is known and pre-set.

24 hours after the pre-preg's production, it is usable and the prepreg can be stored for 30 days in normal temperature, or 90 days if the temperature doesn't reach 20° C.

To create the adhesive, 100 kg of a very flexible vinyl-ester resin, 5 kg of a methyl-methacrylate (MMA) monomer, 3 kg of a thixatropic substance (active silica based, for ex. AEROSIL R202), 100 kg of aluminum-hydroxide (ATH) and 2 kg of diacyle-peroxide, 2 kg of an allyl-aroma-amine (DMA) solution (10 m/m %) is also used as an activator.

2 kg of a cobalt-naphtenate solution (1 m/m %) and 0.5 kg of acetyl-acetone has to be added to the material of the adhesive, to ensure that the peroxide initiator added to the matrix-material will activate at low temperature as well. The adhesive mixed in tis way will be viscously fluid for 30 minutes at normal temperature, and reaches the gelling point after a maximum of 60 minutes.

In this example, a 4 m long prepreg is produced. The full weight of the band is 4.08 kg, the glass-fiber having 1.70 kg. The weight of the adhesive needed is 0.80 kg. The band was used to create an 8-layer band on a 150 mm steel pipe's surface. Water has been transported in the pipe; the water's temperature: 0° C.

The pipe's wall was also at 0° C. A thermometer (thermo par) is placed in the layer closest to the pipe and one in the top layer to follow the inner heat-relations.

The upper layer of the prepreg reached 130° C. in 20 minutes. During this the inner layer remained at 0° C. Heating continued for 60 minutes more, controlling the upper layer's temperature by stabilization. During this time the entire band solidified.

The experiments confirm that the cobalt activator has a pronounced effect on the chemical reactions in the prepreg. This surprising effect can only be explained with the transferring by diffusion of the cobalt mixture from the adhesive to the matrix-material. This transfer is aided by the acetyl-acetone (table column 3).

Example 4

The substances needed to create the prepreg resin's matrix-material are added one by one and homogenized as they are added. In this case, the substances are: 100 kg of an unsaturated polyester resin solution (35 m/m % in sterol) gained from synthesizing o-phtale acid ethylene-glycol-propylene-glycol-mallein-acid-anhydrid at a rate of 1:1; 3 kg of MgO (magnesium-oxide); 5 kg of a thermoplastic polymer (PVAc—polyvinyl-acetate); 3 kg of poly-ϵ-caprolacton, 100 kg of ATH; 2 kg of an initiator with high decomposition temperature per-benzoate).

Part of the ready resin-matrix material is placed on a PET foil. A corresponding sized part (0.3×4 m in this case) of the unidirectional orientated, glass-fiber based enforcing material is then introduced in the foil and soaked well with the resin-matrix (both sides of the material). The soaked glass-fiber is then "ironed" between two vulcanite rolls. The distance between the two rolls is known and pre-set.

24 hours after the prepreg's production, it is usable and the prepreg can be stored without losing properties for 30 days in normal temperature, or 90 days if the temperature doesn't reach 20° C.

To create the adhesive, 100 kg of a bis-phenol vinyl-ester resin, 10 kg of a methyl-methacrylate (MMA) monomer, 5 kg of a thixatropic substance (active silica based, for ex. AEROSIL R202), 50 kg of aluminum-hydroxide (ATH); 50 kg of talcum and 1 kg of cobalt-naphtenate (1% of Co) is used as an activator. To ensure the solidifying of the adhesive, initiators are used: 2 kg of cumol-hydro-peroxide and 1 kg of kethone-peroxide.

The adhesive mixed in this way will be viscously fluid for 30 minutes at normal temperature (23±2° C.), and reaches the gelling point after 60 minutes.

In this example, a 4 m long prepreg is produced. The full weight of the band is 4.10 kg, the glass-fiber having 1.70 kg. The weight of the adhesive needed is 0.80 kg. The band was used to create an 8-layer band on a 150 mm steel pipe's surface. Water has been transported in the pipe; the water's temperature: 0° C.

The pipe's wall was also at 0° C. A thermometer (thermo par) is placed in the layer closest to the pipe and one in the top layer to continuously follow the inner heat-relations.

The upper layer of the prepreg reached 130° C. in 20 minutes. During this the inner layer remained at 0° C. Heating continued for 60 minutes more, controlling the upper layer's temperature by stabilization. During this time the entire band solidified.

These experiments show that the cobalt activator has a pronounced effect on the chemical reactions in the prepreg having different composition compared to the prepreg in the first three experiments. This surprising effect can only be explained with the transferring by diffusion of the cobalt mixture from the adhesive to the matrix-material. This transfer is aided by the MMA monomer mixed into the adhesive, although its aiding effect isn't as powerful as in the cases previously described.

The prepreg adhesive material system containing unsaturated polyester/vinyl-ester resin matrix-materials (composite band) can be fully solidified even if it connects to low temperature (0° C.) surfaces. This is done by adding peroxides to the prepreg's material. The activators that decompose the peroxides are transferred by diffusion between the two different matrixes, and once inside the prepreg they initiate the networking of the polyester/vinyl-ester resin.

The diffusion (and the hardening of the prepreg) is very much enhanced by several substances (the poly-ϵ-caprolacton in the prepreg; methacryl-acid-ester monomers and acetyl-acetone in the adhesive). The choice of cobalt-naphtenate or vanadium-naphtenate doesn't influence the process.

TABLE no. 1

The changes of solidifications circumstances of the prepreg composite band for different experiments

| Number of experiment | 1 | 2 | 3 | 4 | 5 |
|---|---|---|---|---|---|
| Matrix material 100 [kg] | \multicolumn{5}{c}{Matrix material based mixture (M)} | | | | |
| Perkarbonat [kg] | 0.5 | 0.5 | 0.5 | | |
| t-butil-perbenzoat [kg] | 1.5 | 1.5 | 1.5 | 2 | 2 |
| Poli-e-kaprolakton [kg] | 5 | 10 | | 3 | 3 |
| Adhesive material 100 [kg] | \multicolumn{5}{c}{Adhesive based mixture (R)} | | | | |
| MMA monomer [kg] | 10 | 10 | 5 | 10 | 10 |
| Diacilperoxid [kg] | 2 | 2 | 2 | | |
| Ketonperoxid [kg] | | | | 1 | 1 |
| Kumolhidroperoxid [kg] | | | 2 | | |
| N,N-dimethylanilin* [kg] | 2 | 2 | 2 | | 2 |
| Cobaltnaphtenat** [kg] | 2 | 2 | 2 | 1 | |
| Vanadiumnaphtenat*** [kg] | | | | | 1 |
| Acetilaceton [kg] | | | | 0.5 | |
| Temperature [° C.] | | | | | |
| Pipe | 0 | 0 | 0 | 0 | 0 |
| Heat patron | 130 | 130 | 130 | 130 | 130 |
| Solidifying time [minute] | 60 | 60 | 60 | 60 | 60 |

*N,N-dimethylanilin 10 weight %
**Cobaltnaphtenat 1 weight % cobalt
***Vanadiumnaphtenat 1 weight % vanadium TABLE no. 1-continued The changes of solidifications circumstances of the prepreg composite band for different experiments

| Number of experiment | 1 | 2 | 3 | 4 | 5 |
|---|---|---|---|---|---|

Matrix material based mixture (M) 100 kg unsaturated poliester resin obtained from o-phtalic acid and ethylene glycol-propylene glycol-mallein acid anhydride (ratio:1:1) in 35 weight % styrol, 3 kg MgO (magnesia), 5 kg thermoplastics polymer (ACA-acetylcellulose), 100 kg filling material
Adhesive based mixture (R) 100 kg vinyl ester resin, 3 kg tixotropic thixatropic additive, 100 kg filling material

The invention claimed is:

1. Method for arming composite-fabrication to repair, reinforce or enhance stability of open-air located objects with unsaturated polyester/vinyl-ester resin based matrix-materials containing unidirectional oriented banded reinforcing materials in the form of freely deformable multi-layer composite bands, comprising:
   a) transferring an activator needed to harden a prepreg by diffusion from the polyester/vinyl-ester resin based adhesive material,
   b) applying the activator between consecutive layers of a coiled band of the prepreg,
   c) enhancing the matrix material's networking by decomposing peroxides mixed into the matrix at low temperature and
   d) solidifying the band in its entire thickness, wherein said adhesive comprises 30-50 m/m % of an unsaturated polyester resin and/or vinyl-ester resin; 1-10 m/m % of a (meth)acryl-acid-ester monomer; 1-5 m/m % of a thixatropic additive; 30-50 m/m % of aluminum-hydroxide and/or $CaCO_3$ powder and/or talcum or any kind of mixture of these elements; 1-5 m/m % diacil-peroxide, keton-peroxide, kumol-hydro-peroxide or any kind of mixture of these elements; 0.1-1 m/m % of N,N-dimethyl-aniline and/or 0.1-1 m/m % of N,N-diethyl-aniline; 1-5 m/m % of a 1% solution of cobalt-naftenate; 1-5 m/m % solution of 1-5 m/m % vanadium-naphthenate; 0.5-1 m/m % of acetyl-acetone.

2. The method as claimed in claim 1, wherein said the matrix-material used to produce the prepreg comprises: 25-40 m/m % of an unsaturated orto- and/or an isophtalic polyester resin in styrol and/or 35 m/m % of a novolac-epoxy vinyl-ester resin or any mixture of these materials; 5-10 m/m % of MgO, and/or ZnO, and/or BaO and/or CaO; 1-5 m/m % of a thermoplastic polymer; 3-10 m/m % of poly-ϵ-caprolacton; 30-50 m/m % of a filling material.

3. The method as claimed in claim 1, wherein the unidirectional orientated enforcing material used to create the prepreg are 10-50 cm wide and 1-30 m long.

4. The method as claimed in claim 1, wherein the prepreg can be stored at 5-15° C. for at least three months before using, without any essential changing of properties.

5. The method as claimed in claim 1, wherein the enforcing band is coiled around the surface of an object in numerous layers.

6. The method as claimed in claim 1, wherein solidifying the composite band is made possible by electronic heat patrons placed on an upper layer of the band, and polymer initiator-activators mixed in the adhesive and the matrix-material are transferred by diffusion to another material system where they react.

7. The method as claimed in claim 1, wherein the adhesive is applied between layers of the prepreg, the adhesive can repair and cover irregularities, and the activator reaches boundary layer's of the matrix-material causing decomposition of peroxides, realizing in this way total reticulation of the composite band.

8. The method as claimed in claim 1, wherein 3-10 m/m % of poly-ε-caprolacton is added to the prepreg matrix-material to enhance diffusion, and to reduce the rate of shrinking of the matrix-material, thus giving the band's surface a shiny and smooth look.

9. The method as claimed in claim 1, wherein the band created on the surface of the object covers every irregularity, and follows the curves of the object, and wherein a smallest curvature degree in which it can be applied is equal to the diameter of an enforced pipe.

10. The method as claimed in claim 1, wherein the method is useable at low temperatures and on location of an object in need of reinforcing, and wherein the composite matrix-material and the adhesive reticulates, solidifying simultaneously in one step, to insure homogeneity.

11. The method as claimed in claim 1, wherein the method is sped up by blending poly-ε-caprolacton and/or acetyl-acetone and/or (metha-) acryl-acid-ester into the prepreg matrix material, resulting in reducing shrinking of composite band.

12. The method as claimed in claim 2, wherein the thermoplastic polymer comprises cellulose-aceto-butyrate and/or cellulose-acetate.

13. The method as claimed in claim 2, wherein the filling material comprises aluminum-hydroxide, $CaCO_3$ powder, talcum, quartz powder; 0.5-3 m/m % of an initiator.

14. The method as claimed in claim 13, wherein the initiator comprises percarbonate, dibenzoil-peroxide, peroxi-dicarbonate t-butyl-perbenzoate, acetyl-acetone-peroxide, diketal, organic hydroperoxide or any kind of mixture of these substances.

* * * * *